March 1, 1966 H. FLEISCHMANN 3,238,134

METHOD FOR PRODUCING SINGLE-PHASE MIXED CRYSTALS

Filed June 12, 1962 2 Sheets-Sheet 1

March 1, 1966 H. FLEISCHMANN 3,238,134

METHOD FOR PRODUCING SINGLE-PHASE MIXED CRYSTALS

Filed June 12, 1962 2 Sheets-Sheet 2

3,238,134

METHOD FOR PRODUCING SINGLE-PHASE MIXED CRYSTALS

Horst Fleischmann, Erlangen, Germany, assignor to Siemens-Schuckertwerke Aktiengesellschaft, Berlin-Siemensstadt, Germany, a corporation of Germany

Filed June 12, 1962, Ser. No. 201,880
Claims priority, application Germany, June 16, 1961, S 74,365
9 Claims. (Cl. 252—62.3)

Figure 1:
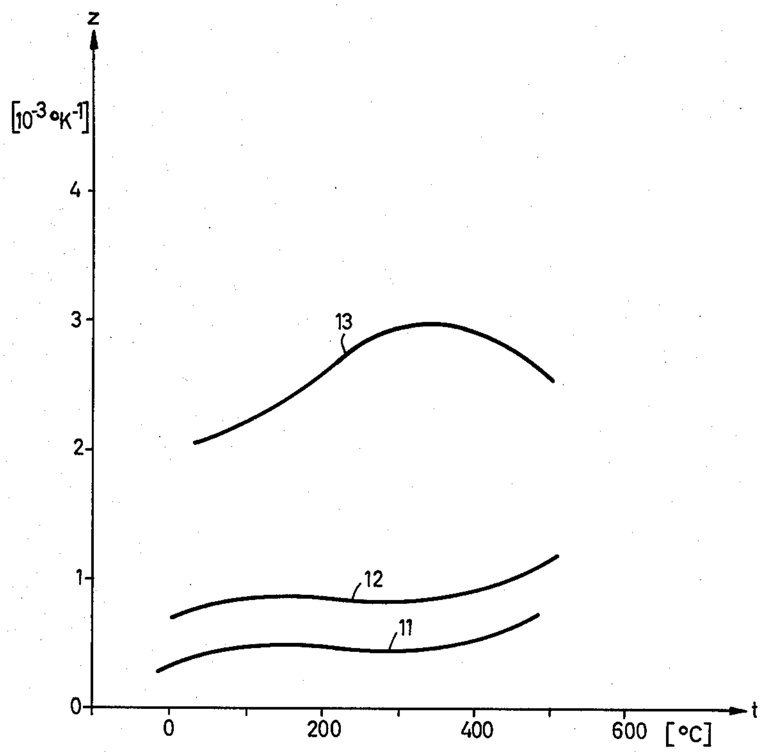

My invention relates to a method for the production of single-phase mixed crystals, preferably from intermetallic terminal compounds and for use as thermoelectric components.

For securing high efficiency in thermoelectric energy production and thermoelectric cooling, a highest feasible ratio of electric conductance ($\sigma$) to thermal conductance ($\kappa$) is required. Customary as a measure of quality for a thermoelectric material is the "thermoelectric effectivity" ($z$) which combines the material parameters essential to the Peltier and Seebeck effects of a thermocouple, and is expressed by the following equation:

$$z=\alpha^2\cdot\sigma/\kappa$$

wherein:

$z$=thermoelectric effectivity
$\alpha$=thermoforce (also the absolute differential thermovoltage)
$\sigma$=electric conductance
$\kappa$=thermal conductance For semiconductors the thermoforce $\alpha$ is not a pronounced constant of the material because the thermoforce values can be changed within wide limits by doping. The electric conductance, although likewise affected to a great extent by doping, is dependent upon the particular material because of its proportionality to the mobility of the electric charge carriers. The thermal conductance of semiconductors depends essentially upon the crystalline lattice structure and thus is a genuine material constant. As regards semiconductor materials, therefore, the value of thermoelectric effectivity $z$ is premodinantly determined by the above-mentioned ratio $\sigma/\kappa$.

It is known that semiconducting mixed crystals possess a higher ratio of electric conductance $\sigma$ to thermal conductance $\kappa$ than their terminal components. The technological realization of the high $\sigma/\kappa$ ratio possible with mixed crystals, however, is dependent upon whether the mixed crystals can be produced in single-phase constitution. Slight inclusions of further phases may greatly reduce the electric conductance $\sigma$ as well as the thermoforce $\alpha$, while increasing the thermal conductance $\kappa$. Generally, therefore, any inclusions of further phases reduce the thermoelectric effectivity. The formation of further phases also takes place during cooling of stoichiometric melts of peritectic compounds, i.e. compounds having a "latent melting point." As is generally the case with mixed crystals, the melt of peritectic compounds and the crystals freezing therefrom and having respectively different compositions, are in equilibrium with each other.

Several methods have become known for producing peritectic compounds from the melt. For preventing the segregation of further phases, the melt is given a composition departing from that of the compound. Accordingly, the known methods require adding an excess amount of one or more of the components so that, with decreasing temperature of the melt, only the desired compound or singular phase is segregated. The necessary homogenization is effected by unidirectional zone melting. However, even with unidirectional zone melting, a segregation of further phases after homogenization cannot be avoided. Such segregation occurs in the last solidifying rod end and is caused by gradual enrichment of the melt or molten zone with one of the components.

It is an object of my invention to provide a more effective and more reliable method for producing single-phase mixed crystals whose terminal compounds consist of at least one peritectic compound.

According to my invention, an elongated rod configuration is prepared from material composed substantially in accordance with the composition of the mixed crystal to be produced but with an excess amount of the lowest melting component of at least one peritectic terminal compound. The rod-shaped body of material thus composed is then subjected to repetitive zone melting in forward and reverse directions and the zone travel distance is successively shortened, thus producing a homogeneous mixed crystal with a single-phase middle portion.

By virtue of the successive shortening of the zone-melting travel, the enrichment in segregated further phases occuring after each individual pass of zone travel is not eliminated by the next following pass in the opposite direction.

The method according to the invention is particularly suitable for the production of mixed crystals from $A^{IV}B^{VI}$ compounds and their ternary substitutes of the type $A^{I}B^{V}C_2^{VI}$ corresponding to the sum formula:

$$\left(A^{I}_{\frac{x}{2}}B^{IV}_{1-x}C^{V}_{\frac{x}{2}}\right)\left(D^{VI}_{1-y}\ E^{VI}_{y}\right)0<x,\ y<1$$

Each of the values $x$ and $y$ in this formula is less than unity but sufficiently greater than zero to make the mixed crystal according to the formula differ appreciably from its two teminal compounds with respect to thermoelectrically significant properties, namely electric conductance, thermal conductance, or both.

Examples of $A^{IV}B^{VI}$ compounds applicable as terminal compounds in such a mixed crystal are:

PbTe, PbSe, SnTe

Applicable as $A^{I}B^{V}C_2^{VI}$ terminal compounds of the mixed crystal are:

$AgSbTe_2$, $AgSbSe_2$, $AgBiTe_2$, $AgBiSe_2$

Among the mixed crystals thus obtainable from the above-mentioned terminal compounds are the following:

$$\left(Ag_{\frac{x}{2}}Pb_{1-x}Sb_{\frac{x}{2}}\right)Te,\ 0<x<1$$

$$\left(Ag_{\frac{x}{2}}Pb_{1-x}Sb_{\frac{x}{2}}\right)(Te_{1-y}Se_y),\ 0<x,\ y<1$$

$$\left(Ag_{\frac{x}{2}}Pb_{1-x}Bi_{\frac{x}{2}}\right)(Te_{1-y}Se_y),\ 0<x,\ y<1$$

The method according to the invention is further well suitable for the produciton of mixed crystals from $A^{III}B^{V}$ compounds and their ternary substitutes of the type $A^{II}B^{IV}C_2^{V}$ in accordance with the general sum formula:

$$\left(A^{II}_{\frac{x}{2}}B^{III}_{1-x}C^{IV}_{\frac{x}{2}}\right)\left(D^{V}_{1-y}E^{V}_{y}\right),\ 0<x,\ y<1$$

A typical example of such a mixed crystal is:

$$\left(Zn_{\frac{x}{2}}In_{1-x}Sn_{\frac{x}{2}}\right)(As_yP_{1-y}),\ 0<x,\ y<1$$

Figure 2:
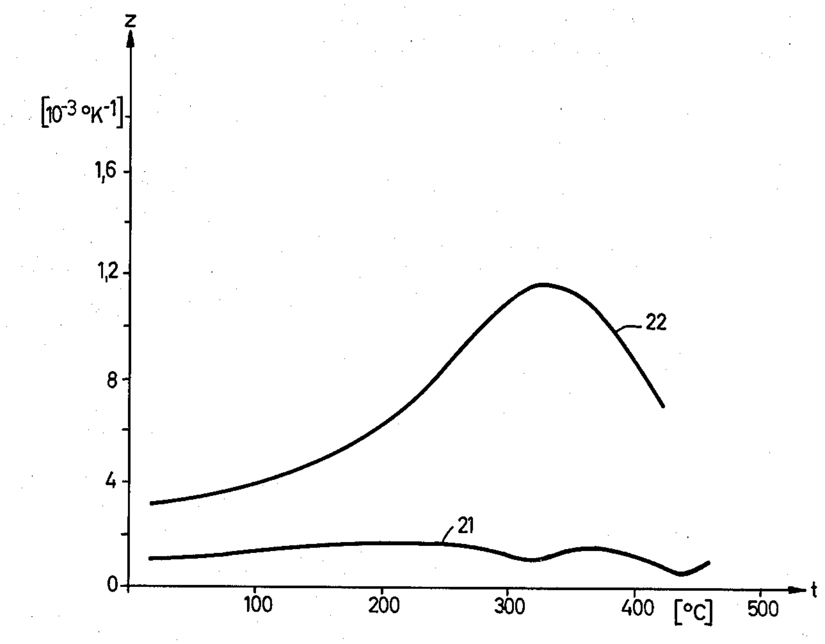

The invention will be further explained with reference to specific examples and in conjunction with the accompanying drawings in which FIGS. 1 and 2 are explanatory diagrams.

Of particular interest for thermoelectric applications is the mixed crystal system.

$$\left(Ag_{\frac{x}{2}}Pb_{1-x}Sb_{\frac{x}{2}}\right)Te$$

The ternary terminal compound $AgSbTe_2$ has a peritectic phase diagram. When the stoichiometric $AgSbTe_2$-melt freezes, a second phase segregates, namely $Ag_2Te$. In the system $$\left(Ag_{\frac{x}{2}}Pb_{1-x}Sb_{\frac{x}{2}}\right)Te$$

the tendency of the $Ag_2Te$-phase to segregate clearly increases toward the peritectic terminal compound $AgSbTe_2$; that is, this tendency increases with increasing parameter value $x$. The theoretically attainable ratio of electric to thermal conductance $\sigma/\kappa$ attainable in the signle-phase material increases in the same direction and reaches a maximum in the vicinity of $x=0.8$. It is therefore of particular interest to produce mixed crystals of the above-mentioned composition for the parameter value $x=0.8$.

For this purpose, the following component quantities for the preparation of the rod structure were weighed:

Ag: 6.1197 g.
Sb: 6.9056 g.+20 mg.
Pb: 5.8771 g.
Te: 18.0970 g.+100 *mg.*

The excess amounts of Te and Sb are necessary on the one hand for keeping the $Ag_2Te$ segregation small in accordance with the peritectic character of the phase diagram. On the other hand, a slight Te excess permitted obtaining the desired doping.

The components, in pulverulent form, were finely distributed into a meling container of trapepoidal cross section having a length of 16 cm. The container consisted of a quartz boat and had a volume of about 9.5 cm.$^3$. To prevent wetting of the inner surface and the formation of bubbles or occlusions, the inner surface of the quartz boat was coated with carbon. This was done by twice carbonizing the boat walls with purest obtainable xylene. The charged boat was placed into a quartz tube having an inner diameter of 1.5 cm. and was heated in vacuum of $10^{-6}$ mm. Hg for 30 minutes at a temperature of about 200° C. Thereafter the quartz tube was sealed and the resulting ampule of approximately 25 cm. length was heated together with the boat to 700° C. in a furnace. Thereafter the ampule with contents was rapidly cooled to 500° C. At this temperature the rod structure in the boat was pre-homogenized by passing a melting zone of 2 cm. width, having a temperature of 576° C. to 580° C., over the entire rod length at a rate of 0.5 mm. per minute. This was done once in forward and return direction. After such pre-homogenization, six additional zone-melting passes were pulled through the rod in alternately opposite directions, but now the zone travel distance was shortened 1 cm. each time toward both sides. After completion of the processing, the $Ag_2Te$ segregations amounted up to about 5% at the rod ends, whereas a middle portion of the rod, amounting to about 40% of the total rod length, was of single-phase constitution. During zone melting, the entire ampule was always kept at a temperature between 500 and 520° C.

The single-phase middle portion thus produced is preferably severed from the end portions to be used for the production of high-quality thermoelectric components.

The diagram in FIG. 1 of the drawing represents the functional relation of the thermoelectric effectivity $z$ to the temperature $t$. The curves denoted by 11, 12 and 13 were computed from measurements of the thermal conductivity, the thermal force, and the electrical conductivity respectively of a rod according to the composition $(Ag_{0.4}Pb_{0.2}Sb_{0.4})Te$ and so demonstrates the difference between the method heretofore employed and the method according to the invention. Curve 11 relates to a rod made according to the method previously employed. This rod contains about 5% $Ag_2Te$ inclusions uniformly distributed over the entire length. Curve 12 represents the measuring data of a second rod of the same composition also produced by the older method but additionally tempered 100 hours at 520° C. The tempering converted the texture to a somewhat more coarsely crystalline constitution and the $Ag_2Te$ inclusions had somewhat declined, still amounting to about 2%. After prolonged tempering (500 hours) no further improvements were obtained.

However, by employing the method according to the invention, the effectivity could be further increased by a factor of 3 to 10, as is apparent from curve 13.

The comparison of the three curves of measuring data according to FIG. 1 conspicuously exhibits the advantage of the invention in contrast to the method heretofore available.

Described in the following is the example of a mixed crystal with two peritectic terminal components, namely $AgSbTe_2$ and $AgBiTe_2$. The particular mixed crystal produced had the composition $Ag_2SbBiTe_4$.

Similar to $AgSbTe_2$, the compound $AgBiTe_2$ occurs in two-phase constitution when a stoichiometric melt freezes. The peritectic character of $AgBiTe_2$ is apparent, inter alia, from the fact that single-phase material of good thermoelectric properties is obtainable therefrom with the aid of known methods for the production of peritectic compounds. In order to produce a mixed crystal from the peritectic compounds $AgBiTe_2$ and $AgSbTe_2$, the stoichiometric proportions of the elements were prepared in pulverulent form and, in addition, various quantities were added of the component having the lowest melting point in one of the peritectic terminal compounds. In the present case, the latter compound was $Bi_2Te_3$. The addition thus made was 1 mole percent $Bi_2Te_3$. For this addition the component quantities weighed were:

Ag: 12.1556 g.
Sb: 6.8599 g.
Bi: 12.0106 g.
Te: 28.9739 g.

The weighed quantities were melted and the resulting rod-shaped structure was homogenized by three forward and reverse zone-melting passes at a rate of 0.5 mm. per minute.

After such processing the still present $Ag_2Te$-phase was uniformly distributed over the length of the rod. The thermoelectric data are represented by curve 21 in FIG. 2.

The melting temperature was about 550° C. and the temperature of the pre-heating furnace was kept at 480° C. After pre-homogenization, three additional forward and reverse zone passes were applied, and the zone-melting travel toward both sides was shortened each time by 3 cm. The total length of the rod was 17 cm. It was found that this caused the second phase to become greatly enriched at the rod ends whereas the middle portion of the rod contained less than 1% of the second phase. The thermoelectric data of the middle portion are represented by curve 22 in FIG. 2.

Another advantage of the invention is the fact that even without accurate knowledge of the additional quantities to be added to the stoichiometric composition of the peritectic components, a single-phase mixed crystal is obtained in the middle portion of the rod.

I claim:

1. The method of producing a single-phase mixed crystal of which at least one terminal compound is peritectic, comprising the steps of preparing a rod-shaped structure of mixed crystal material containing the lowest melting component of at least one peritectic compound in an amount above the stoichiometric proportion of the compound, repeatedly subjecting the rod structure to zone melting in forward and reverse directions, and successively shortening the zone travel to produce a mixed crystal having a homogeneous single-phase middle portion.

2. The method of producing a single-phase mixed crystal of which at least one terminal compound is peritectic, comprising the steps of preparing a rod-shaped structure of mixed crystal material containing the lowest melting component of at least one peritectic compound in an amount above the stoichiometric proportion of the compound, repeatedly subjecting the rod structure to zone melting in forward and reverse directions, and successively shortening the zone travel in each travel direction toward the end of travel to produce a mixed crystal having a substantially single-phase middle portion, and discarding the end portions from the middle portion.

3. The method of producing a single-phase mixed crystal of which at least one terminal compound is peritectic, comprising the steps of preparing a rod-shaped structure of mixed crystal material containing the lowest melting component of at least one peritectic compound in an amount above the stoichiometric proportion of the compound, pre-homogenizing the rod structure by subjecting it to zone melting in forward and reverse directions over its entire length, thereafter subjecting the rod structure to repeated further zone melting in forward and reverse directions, and successively shortening the zone travel to produce a homogeneous mixed crystal having a single-phase middle portion.

4. The method of producing a single-phase mixed crystal of which at least one terminal compound is peritectic, comprising the steps of preparing a rod-shaped structure of mixed crystal material containing the lowest melting component of at least one peritectic compound in an amount above the stoichiometric proportion of the compound, repeatedly subjecting the rod structure to zone melting in forward and reverse directions within an elongated melting container having a non-wettable surface in contact with said structure, and successively shortening the zone travel to produce a homogeneous mixed crystal having a single-phase middle portion.

5. The method of producing a single-phase mixed crystal according to claim 4, wherein the melting container has a carbon-coated inner surface.

6. The method of producing a single-phase mixed crystal of which at least one terminal compound is peritectic, wherein the terminal compounds of the mixed crystal consist of compounds selected from the group consisting of the type $A^{IV}B^{VI}$ and their ternary substitutes of the type $A^{I}B^{V}C_2^{VI}$, comprising the steps of preparing a rod-shaped structure of mixed crystal material containing the lowest melting component of at least one peritectic compound in an amount above the stoichiometric proportion of the compound, repeatedly subjecting the rod structure to zone melting in forward and reverse directions, and successively shortening the zone travel to produce a mixed crystal having a homogeneous single-phase middle portion.

7. The method of producing a single-phase mixed crystal of which at least one terminal compound is peritectic, wherein the terminal compounds of the mixed crystal consist of compounds selected from the group consisting of the type $A^{III}B^{V}$ and their ternary substitutes of the type $A^{II}B^{IV}C_2^{V}$, comprising the steps of preparing a rod-shaped structure of mixed crystal material containing the lowest melting component of at least one peritectic compound in an amount above the stoichiometric proportion of the compound, repeatedly subjecting the rod structure to zone melting in forward and reverse directions, and successively shortening the zone travel to produce a mixed crystal having a homogeneous single-phase middle portion.

8. The method of producing a single-phase mixed crystal of $$\left(Ag_{\frac{x}{2}}Pb_{1-x}Sb_{\frac{x}{2}}\right)Te$$

wherein $0<x<1$, which comprises preparing a rod-shaped structure of mixed crystal material containing an excess of at least one element selected from the group consisting of antimony and tellurium, pre-homogenizing the rod structure by subjecting it to zone melting in forward and reverse directions over its entire length, thereafter subjecting the rod structure to repeated further zone melting in forward and reverse directions, and successively shortening the zone travel to produce a homogeneous mixed crystal having a single-phase middle portion.

9. The method of producing a single-phase mixed crystal of $Ag_2SbBiTe_4$ having the peritectic terminal components $AgSbTe_2$ and $AgBiTe_2$ which comprises preparing a rod-shaped structure of $Ag_2SbBiTe_4$ containing a slight excess of $Bi_2Te_3$ the lowest melting component of one of said peritectic terminal compounds, pre-homogenizing the rod structure by subjecting it to zone melting in forward and reverse directions over its entire length, thereafter subjecting the rod structure to repeated further zone melting in forward and reverse directions, and successively shortening the zone travel to produce a homogeneous mixed crystal having a single-phase middle portion.

References Cited by the Examiner

Harman: "Effects of Zone Refining Variables on the Segregation of Impurities in Indium Antimonide," Journal of Electrochemical Society, vol. 103, No. 2, February 1956, pages 128–132.

Pfann: Zone Melting, John Wiley & Sons Inc., New York, 1958, pages 153–170.

Wernick: "Metallurgy of Some Ternary Semiconductors, etc.," article in Properties of Elemental and Compound Semiconductors, edited by Gatos, Interscience Publishers, New York, 1960, pages 69–88.

SAMUEL H. BLECH, *Primary Examiner.*

MAURICE A. BRINDISI, *Examiner.*

R. D. EDMONDS, *Assistant Examiner.*